US012741403B2

(12) United States Patent
Kodemura et al.

(10) Patent No.: US 12,741,403 B2
(45) Date of Patent: Sep. 22, 2026

(54) METHOD FOR PRODUCING DIP-MOLDED ARTICLE

(71) Applicant: ZEON CORPORATION, Tokyo (JP)

(72) Inventors: Junji Kodemura, Tokyo (JP); Misa Hayashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 776 days.

(21) Appl. No.: 17/800,935

(22) PCT Filed: Feb. 8, 2021

(86) PCT No.: PCT/JP2021/004674
§ 371 (c)(1),
(2) Date: Aug. 19, 2022

(87) PCT Pub. No.: WO2021/171994
PCT Pub. Date: Sep. 2, 2021

(65) Prior Publication Data

US 2023/0088356 A1 Mar. 23, 2023

(30) Foreign Application Priority Data

Feb. 27, 2020 (JP) ................................ 2020-031350

(51) Int. Cl.

| | |
|---|---|
| ***B29C 41/14*** | (2006.01) |
| ***B29C 41/36*** | (2006.01) |
| ***B29C 41/52*** | (2006.01) |
| ***C08F 255/00*** | (2006.01) |
| ***C08L 13/02*** | (2006.01) |

(52) U.S. Cl.
CPC .............. *B29C 41/14* (2013.01); *B29C 41/36* (2013.01); *B29C 41/52* (2013.01); *C08F 255/00* (2013.01); *C08L 13/02* (2013.01)

(58) Field of Classification Search
CPC ......... B29C 41/14; B29C 41/36; B29C 41/52; B29C 41/003; B29C 41/42; A41D 19/0058; C08J 9/04; C08J 2309/04
See application file for complete search history.

(56) References Cited

U.S. PATENT DOCUMENTS

| | | | | |
|---|---|---|---|---|
| 5,229,061 | A * | 7/1993 | Van Dyke | B29C 33/42 264/303 |
| 6,284,856 | B1 * | 9/2001 | Lee | C08F 220/12 526/329 |
| 8,563,644 | B2 * | 10/2013 | Imada | B32B 25/14 524/446 |
| 2012/0021155 | A1 * | 1/2012 | Chen | A61B 42/10 433/136 |
| 2015/0376322 | A1 | 12/2015 | Nakamura et al. | |
| 2017/0342242 | A1 | 11/2017 | Kato | |
| 2018/0345542 | A1 * | 12/2018 | Frauendorf | A41D 13/008 |
| 2019/0031861 | A1 * | 1/2019 | Satoh | B01F 23/40 |
| 2020/0056019 | A1 | 2/2020 | Aihara et al. | |

FOREIGN PATENT DOCUMENTS

| | | | |
|---|---|---|---|
| WO | 2014/129547 | A1 | 8/2014 |
| WO | 2016/104057 | A1 | 6/2016 |
| WO | 2018/155243 | A1 | 8/2018 |
| WO | 2019/058807 | A1 | 3/2019 |

OTHER PUBLICATIONS

Mar. 16, 2021 International Search Report issued in International Patent Application No. PCT/JP2021/004674.
Mar. 7, 2024 Search Report issued in European Patent Application No. 21759647.7.

* cited by examiner

*Primary Examiner* — Larry W Thrower
(74) *Attorney, Agent, or Firm* — Oliff PLC

(57) ABSTRACT

A method for producing a dip-molded article, the method including steps of immersing a mold for dip molding in a coagulant solution to deposit the coagulant on the mold for dip molding; providing a latex composition containing a carboxy-modified conjugated diene polymer latex which is a dispersion of carboxy-modified conjugated diene polymer particles having a volume average particle size of 500 to 2,000 nm in water; and immersing the mold for dip molding having the coagulant deposited thereon in the latex composition to obtain a dip-molded article having a thickness of 0.02 to 0.19 mm.

9 Claims, No Drawings

METHOD FOR PRODUCING DIP-MOLDED ARTICLE

TECHNICAL FIELD

The present invention relates to a method for producing a dip-molded article, and relates to a method for producing a dip-molded article having excellent tensile strength, tensile elongation, and tear strength, and exhibiting a suppressed occurrence of a structural defect such as a pinhole.

BACKGROUND ART

Conventionally, it has been known that molded films, such as dip-molded articles (e.g., teats, balloons, gloves, balloons, and stalls), used in contact with the human body can be obtained by dip molding a latex composition containing natural rubber latex. However, in some cases, such dip-molded articles are not suitable for use in direct contact with the mucosa or organs of a living body because the natural rubber latex contains proteins that may cause immediate (Type I) allergic reactions in the human body. In response to this problem, the removal of proteins in natural rubber latex by purification or the like and the use of a synthetic rubber latex instead of natural rubber latex have been studied.

For example, Patent Document 1 discloses a composition for dip molding which is a latex composition containing zinc oxide, sulfur, and a vulcanization accelerator mixed with a latex of synthetic polyisoprene as a synthetic rubber. However, the technique of Patent Document 1 easily causes a structural defect such as a pinhole in the case where a relatively thin dip-molded article is produced, and results in a dip-molded article having insufficient tensile strength, tensile elongation, and tear strength. In view of this issue, there is a demand for a dip-molded article that is relatively thin, has enhanced tensile strength, tensile elongation, and tear strength, and exhibits a suppressed occurrence of a structural defect.

RELATED ART

Patent Documents

Patent Document 1: International Publication No. WO 2014/129547

SUMMARY OF THE INVENTION

Problem to be Solved by the Invention

The present invention is devised in response to the current issues, and an objective thereof is to provide a method for producing a dip-molded article having excellent tensile strength, tensile elongation, and tear strength, and exhibiting a suppressed occurrence of a structural defect such as a pinhole.

Means for Solving the Problem

As a result of dedicated research to achieve the aforementioned objective, the inventors have found that the objective can be achieved by using a latex composition containing a latex of a carboxy-modified conjugated diene polymer having a specific particle size, and controlling the thickness of the resulting dip-molded article within a specific range, thereby accomplishing the present invention.

Specifically, the present invention provides a method for producing a dip-molded article, the method comprising steps of immersing a mold for dip molding in a coagulant solution to deposit the coagulant on the mold for dip molding; providing a latex composition containing a carboxy-modified diene polymer latex which is a dispersion of carboxy-modified conjugated diene polymer particles having a volume average particle size of 500 to 2,000 nm in water; and immersing the mold for dip molding having the coagulant deposited thereon in the latex composition to obtain a dip-molded article having a thickness of 0.02 to 0.19 mm.

In the method for producing a dip-molded article according to the present invention, the dip-molded article preferably has a thickness of 0.02 to 0.15 mm, more preferably 0.02 to 0.10 mm, further more preferably greater than or equal to 0.02 mm and less than 0.08 mm.

In the method for producing a dip-molded article according to the present invention, the mold for dip molding used preferably has a non-roughened surface.

In the method for producing a dip-molded article according to the present invention, the concentration of the coagulant in the coagulant solution is preferably 0.1 to 20 wt %.

In the method for producing a dip-molded article according to the present invention, the immersion time in the immersing of the mold for dip molding in the coagulant solution is preferably controlled to 0.1 to 20 seconds.

In the method for producing a dip-molded article according to the present invention, the temperature of the mold for dip molding in the immersing of the mold for dip molding in the coagulant solution is preferably controlled to 20 to 100° C.

In the method for producing a dip-molded article according to the present invention, the immersion time in the immersing of the mold for dip molding having the coagulant deposited thereon in the latex position is preferably controlled to 1 to 20 seconds.

In the method for producing the dip-molded article according to the present invention, the solids content of the latex composition is preferably 1 to 40 wt %.

In the method for producing a dip-molded article according to the present invention, the carboxy-modified conjugated diene polymer latex is preferably a latex of a synthetic polyisoprene, a styrene-isoprene-styrene block copolymer, or a protein-free natural rubber.

In the method for producing a dip-molded article according to the present invention, the latex composition preferably further comprises a sulfur-based vulcanizing agent.

In the method for producing the dip-molded article according to the present invention, the latex composition preferably further comprises a vulcanization accelerator.

In the method for producing the dip-molded article according to the present invention, the vulcanization accelerator is preferably a xanthogen compound.

Effects of Invention

The present invention can provide a method for producing a dip-molded article having excellent tensile strength, tensile elongation, and tear strength, and exhibiting a suppressed occurrence of a structural defect such as a pinhole.

DESCRIPTION OF EMBODIMENTS

A method for producing a dip-molded article according to the present invention comprising steps of:

immersing a mold for dip molding in a coagulant solution to deposit the coagulant on the mold for dip molding;

providing a latex composition containing a carboxy-modified conjugated diene polymer latex which is a dispersion of carboxy-modified conjugated diene polymer particles having a volume average particle size of 500 to 2,000 nm in water; and immersing the mold for dip molding having the coagulant deposited thereon in the latex composition to obtain a dip-molded article having a thickness of 0.02 to 0.19 mm.

Latex Composition

The latex composition used in the present invention contains a carboxy-modified conjugated diene polymer latex.

The carboxy-modified conjugated diene polymer latex is a latex of a carboxy-modified conjugated diene polymer obtained by modifying a conjugated diene polymer with a monomer having a carboxyl group.

Examples of the conjugated diene polymer used in the present invention include, but are not limited to, synthetic polyisoprenes, styrene-isoprene-styrene block copolymers (SIS), deproteinized natural rubbers (protein-free natural rubbers), nitrile group-containing conjugated diene copolymers, and the like. Among these, preferred are polymers containing isoprene units such as synthetic polyisoprenes, SIS, and deproteinized natural rubbers. In particular, synthetic polyisoprenes are preferred.

In the case of using a synthetic polyisoprene as the conjugated diene polymer, the synthetic polyisoprene may be an isoprene homopolymer or may be a copolymer of isoprene and a different ethylenically unsaturated monomer copolymerizable with isoprene. The content of isoprene units in the synthetic polyisoprene is preferably 70 wt % or more, more preferably 90 wt % or more, further more preferably 95 wt % or more, particularly preferably 100 wt % (homopolymer of isoprene) with respect to the total monomer units for ease of obtaining a dip-molded article which is flexible and has excellent tensile strength.

Examples of different ethylenically unsaturated monomers copolymerizable with isoprene include conjugated diene monomers other than isoprene, such as butadiene, chloroprene, and 1,3-pentadiene; ethylenically unsaturated nitrile monomers, such as acrylonitrile, methacrylonitrile, fumaronitrile, and $\alpha$-chloroacrylonitrile; vinyl aromatic monomers, such as styrene and alkyl styrenes; ethylenically unsaturated carboxylic acid ester monomers, such as methyl (meth) acrylate (which means "methyl acrylate and/or methyl methacrylate", and hereinafter, the same applies to ethyl (meth) acrylate and the like), ethyl (meth) acrylate, butyl (meth) acrylate, and 2-ethylhexyl (meth) acrylate; and the like. One of these ethylenically unsaturated monomers copolymerizable with isoprene may be used alone, or two or more of them may be used in combination.

The synthetic polyisoprene can be obtained by conventionally known methods such as solution polymerization of isoprene optionally with a different ethylenically unsaturated copolymerizable monomer in an inert polymerization solvent using a Ziegler polymerization catalyst composed of trialkylaluminum-titanium tetrachloride or an alkyl lithium polymerization catalyst such as n-butyl lithium or sec-butyl lithium. Although the polymer solution of synthetic polyisoprene obtained by the solution polymerization may be used as it is to produce a synthetic polyisoprene latex, solid synthetic isoprene may be extracted from the polymer solution and be dissolved in an organic solvent to prepare a solution, which is then used to produce a synthetic polyisoprene latex. As described later, the synthetic polyisoprene latex can be used to produce the carboxy-modified conjugated diene polymer latex used in the present invention.

In the case where a synthetic polyisoprene solution is prepared by the above-mentioned method, impurities including residual polymerization catalyst in the polymer solution may be removed. Further, during or after the polymerization, an antioxidant described later may be added to the solution. Alternatively, commercially available solid synthetic polyisoprene may be used.

There are the following four types of isoprene units in the synthetic polyisoprene which differ in bonding geometry of isoprene units: cis bond unit, trans bond unit, 1,2-vinyl bond unit, and 3,4-vinyl bond unit. In order to obtain a dip-molded article having enhanced tensile strength, the content of cis bond units among the isoprene units contained in the synthetic polyisoprene is preferably 70 wt % or more, more preferably 90 wt % or more, further more preferably 95 wt % or more with respect to the total isoprene units.

The weight average molecular weight of the synthetic polyisoprene preferably 10,000 to 5,000,000, more preferably 500,000 to 5,000,000, further more preferably 800,000 to 3,000,000 as calibrated against polystyrene standards by gel permeation chromatography. Adjusting the weight average molecular weight of the synthetic polyisoprene within the above ranges tends to result in a dip-molded article having further enhanced tensile strength, tensile elongation, and tear strength, and facilitate the production of the synthetic polyisoprene latex.

The polymer Mooney viscosity ($ML_{1+4}$, 100° C.) of the synthetic polyisoprene is preferably 50 to 80, more preferably 60 to 80, further more preferably 70 to 80.

Examples of methods for providing the synthetic polyisoprene latex include (1) a method for producing the synthetic polyisoprene latex by emulsifying a solution or microsuspension of the synthetic polyisoprene, which is dissolved or finely dispersed in an organic solvent, in water in the presence of an emulsifier, followed by removal of the organic solvent, as required, and (2) a method for directly producing the synthetic polyisoprene latex by emulsion polymerization or suspension polymerization of isoprene alone or a mixture of isoprene with an ethylenically unsaturated monomer copolymerizable with isoprene in the presence of an emulsifier. The production method (1) is preferable since this method allows the use of a synthetic polyisoprene in which cis bond units occupy a high proportion of the total isoprene units, and tends to result in a dip-molded article having excellent mechanical properties such as tensile strength.

Examples of organic solvents usable in the production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; halogenated hydrocarbon solvents such as methylene chloride, chloroform, and ethylene dichloride; and the like. Among these, preferred are alicyclic hydrocarbon solvents and aliphatic hydrocarbon solvents, more preferred are pentane, cyclohexane, and n-hexane, and particularly preferred is n-hexane.

The amount of the organic solvent used is preferably 2,000 parts by weight or less, more preferably 20 to 1,500 parts by weight, further more preferably 500 to 1,500 parts by weight with respect to 100 parts by weight of the synthetic polyisoprene.

Preferred emulsifiers for use in the production method (1) are ionic emulsifiers. In particular, anionic emulsifiers are more preferred. Examples of anionic emulsifiers include fatty acid salts such as sodium laurate, potassium myristate, sodium palmitate, potassium oleate, sodium linolenate, sodium rosinate, and potassium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di (2-ethylhexyl) sulfosuccinate, potassium di (2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphate salts such as sodium lauryl phosphate and potassium lauryl phosphate; and the like.

Among these anionic emulsifiers, preferred are fatty acid salts, alkylbenzene sulfonates, alkyl sulfosuccinates, alkyl sulfate ester salts, and polyoxyethylene alkyl ether sulfate ester salts, and particularly preferred are fatty acid salts and alkylbenzene sulfonates.

A combination of at least one selected from the group consisting of alkylbenzene sulfonates, alkyl sulfosuccinates, alkyl sulfate ester salts, and polyoxyethylene alkyl ether sulfate ester salts and a fatty acid salt is preferably used to more efficiently remove a trace of residual polymerization catalyst (in particular, aluminum and titanium) derived from the synthetic polyisoprene and suppress the occurrence of aggregates in the process of producing a latex composition. In particular, a combination of an alkylbenzene sulfonate and a fatty acid salt is preferably used. In this case, preferred fatty acid salts are sodium rosinate and potassium rosinate, and preferred alkylbenzene sulfonates are sodium dodecylbenzenesulfonate and potassium dodecylbenzenesulfonate. One of these emulsifiers may be used alone, or two or more of them may be used in combination.

The above use of a combination of at least one selected from the group consisting of alkylbenzene sulfonates, alkyl sulfosuccinates, alkyl sulfate ester salts, and polyoxyethylene alkyl ether sulfate ester salts and a tatty acid salt provides a latex containing the at least one selected from the group consisting of alkylbenzene sulfonates, alkyl sulfosuccinates, alkyl sulfate ester salts, and polyoxyethylene alkyl ether sulfate ester salts, and the fatty acid salt.

Examples of ionic emulsifiers other than anionic emulsifiers include copolymerizable emulsifiers such as sulfa esters of $\alpha,\beta$-unsaturated carboxylic acids, sulfate esters of $\alpha,\beta$-unsaturated carboxylic acids, and sulfoalkylaryl ethers.

Further, any of nonionic emulsifiers such as polyoxyethylene alkyl ethers, polyoxyethylene alkyl phenol ethers, polyoxyethylene alkyl esters, and polyoxyethylene sorbitan alkyl esters may be used in combination as long as they do not inhibit coagulation by the action of a coagulant used in dip molding.

The amount of emulsifier(s) used in the production method (1) is preferably 0.1 to 50 parts by weight, more preferably 0.5 to 30 parts by weight with respect to 100 parts by weight of the synthetic polyisoprene. When two or more emulsifiers are used, the total amount thereof is preferably adjusted within the above ranges. Specifically, for example, when a combination of at least one selected from the group consisting of alkylbenzene sulfonates, alkyl sulfosuccinates, alkyl sulfate ester salts, and polyoxyethylene alkyl ether sulfate ester salts and a fatty acid salt is used, the total amount of the emulsifiers used preferably falls within the above ranges. By using emulsifier(s) in an amount within the above ranges, the occurrence of aggregates during emulsification can be more effectively suppressed.

When a combination of at least one selected from the group consisting of alkylbenzene sulfonates, alkyl sulfosuccinates alkyl sulfate ester salts, and polyoxyethylene alkyl ether sulfate ester salts and a fatty acid salt is used as an anionic emulsifier, the ratio "fatty acid salt":"total of at least one selected from the group consisting of alkylbenzene sultanates, alkyl sulfosuccinates, alkyl sulfate ester salts, and polyoxyethylene alkyl ether sulfate ester salts" on a weight basis is in the, range of preferably 1:1 to 10:1, more preferably 1: 1 to 7:1. The use of at least one emulsifier selected from the group consisting of alkylbenzene sulfonates, alkyl sulfosuccinates, alkyl sulfate ester salts, and polyoxyethylene alkyl ether sulfate ester salts at a ratio controlled within the ranges suppresses foaming of the synthetic polyisoprene during handling thereof. This eliminates the need of processes such as long-term standing and addition of a defoamer, leading to improved work efficiency and reduced costs.

The amount of water used in the production method (1) is preferably 10 to 1,000 parts by weight, more preferably 30 to 500 parts by weight, most preferably 50 to 100 parts by weight with respect to 100 parts by weight of the organic solvent solution of the synthetic polyisoprene. Examples of the type of water used include hard water, soft water, deionized water, distilled water, zeolite water and the like. Preferred are soft water, deionized water, and distilled water.

To emulsify the solution or microsuspension of the synthetic polyisoprene dissolved or finely dispersed in the organic solvent, in water in the presence of the emulsifier, any apparatus commercially available as an emulsifying machine or a dispersing machine can be used without limitation. The emulsifier can be added to the solution or microsuspension of the synthetic polyisoprene in any manner without limitation, and the emulsifier may be added in advance to either or both of water and the organic solvent solution or microsuspension of the synthetic polyisoprene, or may be added all at once or in portions to the liquid to be emulsified during the emulsification process.

Examples of emulsifying machines include batch emulsifying machines such as "Homogenizer" (trade name, available from IKA Works), "POLYTRON" (trade name, available from Kinematica AG) , and "TK AUTO-HOMO MIXER" (trade name, available from Tokushu Kika Kogyo Co., Ltd.); continuous emulsifying machines such as "TK PIPELINE-HOMO MIXER" (trade name, available from Tokushu Kika Kogyo Co., Ltd.), "Colloidmill" (trade name, available from Shinko Pantec Co., Ltd.), "SLASHER" (trade name, available from NIPPON COKE & ENGINEERING CO., LTD.), "Trigonal wet grinder" (trade name, available from Mitsui Miike Chemical Engineering Machinery, Co., Ltd.), "CAVITRON" (trade name, available from Eurotec, Ltd.), "MILDER" (trade name, available from Pacific Machinery & Engineering Co. Ltd.) and "FINE FLOW MILL" (trade name, available from Pacific Machinery & Engineering Co., Ltd.); high-pressure emulsifying machines such as "Microfluidizer" (trade name, available from MIZUHO INDUSTRIAL CO., LTD.), "NANOMIZER" (trade name, available from NANOMIZER Inc.), and "APV GAULIN" (trade name, available from Manton-Gaulin Company); membrane emulsifying machines such as "Membrane emulsifying machine" (trade name, available from REICA Co., Ltd.); vibratory emulsifying machines such as "VIBROMIXER" (trade name, available from REICA Co., Ltd.); ultrasonic emulsifying machines such as "Ultrasonic homogenizer" (trade name, available from Branson Ultrasonics Corporation); and the like. The conditions for the emulsification process using such an emulsifying machine are not particularly limited, and the treatment temperature, the treatment time, and the like may be appropriately selected to ensure a desired dispersion state.

In the production method (1), the organic solvent is preferably removed from the emulsion prepared through the emulsification process.

Preferred methods for removing the organic solvent from the emulsion are methods with which the amount of the organic solvent (preferably alicyclic hydrocarbon solvent or aliphatic hydrocarbon solvent) in the resulting synthetic polyisoprene latex can be reduced to 500 ppm by weight or less. For example, methods such as vacuum distillation, normal pressure distillation, water vapor distillation, and centrifugation can be employed.

The organic solvent can be removed while adding a defoamer. The addition of a defoamer can prevent the synthetic polyisoprene from foaming.

Further, in order to increase the solids content of the synthetic polyisoprene latex, a concentration process by vacuum distillation, normal pressure distillation, centrifugation, membrane concentration, or the like may be performed as needed after removal of the organic solvent. In particular, centrifugation is preferably performed because it can increase the solids content of the synthetic polyisoprene latex and reduce the amount of residual emulsifier in the synthetic polyisoprene latex.

The centrifugation is preferably performed, for example, using a continuous centrifuge under the conditions in which the centrifugal force is preferably 100 to 10,000 G, the solids content of the synthetic polyisoprene latex before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The synthetic polyisoprene latex can be obtained as a light liquid after the centrifugation. This process reduces the amount of residual emulsifier in the synthetic polyisoprene latex.

The solids content of the synthetic polyisoprene latex is preferably 30 to 70 wt %, more preferably 40 to 70 wt %, further more preferably 50 t 70 wt %. When the solids content is not less than the lower limit of the above ranges, a tear resistant dip-molded article (described later) can be produced. When the solids content is not more than the upper limit of the above ranges, the viscosity of the synthetic polyisoprene latex will not increase too high, which facilitates transfer of the synthetic polyisoprene latex through a pipe and stirring of the synthetic polyisoprene latex in a preparation tank.

The volume average particle size of the synthetic polyisoprene latex is preferably 0.1 to 10 μm, more preferably 0.5 to 3 μm, further more preferably 0.5 to 2.0 μm. Adjusting the volume average particle size within the above ranges leads to appropriate viscosity of the latex to ensure ease of handling, and can suppress formation of a film on the surface of the latex during storage of the synthetic polyisoprene latex.

Further, the synthetic polyisoprene latex may contain additives typically used in the field of latex, such as a pH adjuster, a defoamer, a preservative, a cross-linking agent, a chelating agent, an oxygen scavenger, a dispersant, and an antioxidant.

Examples of pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides and ammonia.

As described above, the conjugated diene polymer can be a styrene-isoprene-styrene block copolymer (SIS). In the term "SIS", "S" represents a styrene block, and "I" represents an isoprene block.

The SIS can be prepared by a conventionally known method such as block copolymerization of isoprene and styrene in an inert polymerization solvent using an active organic metal such as n-butyl lithium as an initiator. Although the resulting polymer solution of SIS may be used as it is to produce an SIS latex, solid SIS may be extracted from the polymer solution and be dissolved in an organic solvent to prepare a solution, which is then used to produce an SIS latex. As described below, the SIS latex can be used to produce the carboxy-modified polymer latex used in the present invention. Any method for producing the SIS latex can be used without limitation. Preferred is a method for producing the SIS latex by emulsifying a solution or microsuspension of SIS, which is dissolved or finely dispersed in an organic solvent, in water in the presence of an emulsifier and removing the organic solvent as required.

In this case, impurities including residual polymerization catalyst in the polymer solution after synthesis may be removed. During or after polymerization, an antioxidant (described later) may be added to the solution. Alternatively, commercially available solid SIS can be used.

Examples of usable organic solvents include the same organic solvents as those listed for the synthetic polyisoprene. Preferred are aromatic hydrocarbon solvents and alicyclic hydrocarbon solvents, and particularly preferred are cyclohexane and toluene.

The amount of the organic solvent used is typically 50 to 2,000 parts by weight, preferably 80 to 1,000 parts by weight, more preferably 100 to 500 parts by weight, further more preferably 150 to 300 parts by weight with respect to 100 parts by weight of the SIS.

Examples of emulsifiers include the same emulsifiers as those listed for the synthetic polyisoprene. Suitable are anionic emulsifiers, and particularly preferred are potassium rosinate and sodium dodecylbenzenesulfonate.

The amount of the emulsifier used is preferably 0.1 to 50 parts by weight, more preferably 0.5 to 30 parts by weight with respect to 100 parts by weight of the SIS. The use of the emulsifier in an amount within the above ranges can result in latex having enhanced stability.

The amount of water used in the aforementioned method for producing the SIS latex is preferably 10 to 1,000 parts by weight, more preferably 30 to 500 parts by weight, most preferably 50 to 100 parts by weight with respect to 100 parts by weight of the organic solvent solution of the SIS. Examples of the type of water used include hard water, soft water, deionized water, distilled water, zeolite water, and the like. Further, any of polar solvents typified by alcohols such as methanol may be used in combination with water.

Examples of apparatuses for emulsifying the organic solvent solution or microsuspension of the SIS in water in the presence of the emulsifier include the same apparatuses as described above for the synthetic polyisoprene. The emulsifier can be added in any manner without limitation, and the emulsifier may be added in advance to either or both of water and the organic solvent solution or microsuspension of the SIS, or may be added all at once or in portions to the liquid to be emulsified during the emulsification process.

In the aforementioned method for producing the SIS latex, the SIS latex is preferably obtained by removing the organic solvent from the emulsion obtained by the emulsification process. The organic solvent can be removed from the emulsion by any method without limitation, and methods such as vacuum distillation, normal pressure distillation, water vapor distillation, and centrifugation can be employed.

The organic solvent can be removed while adding a defoamer. The addition of a defoamer can further prevent foaming.

Further, in order to increase the solids content of the SIS latex, a concentration process by vacuum distillation, normal pressure distillation, centrifugation, membrane concentration, or the like may be performed as needed after removal of the organic solvent.

The solids content of the SIS latex is preferably 30 to 70 wt %, more preferably 40 to 70 wt %, further more preferably 50 to 70 wt %. When the solids content is not less than the lower limit of the above ranges, a tear resistant dip-molded article (described later) can be produced. When the solids content is not more than the upper limit of the above ranges, the viscosity of the synthetic polyisoprene latex will not increase too high, which facilitates transfer of the SIS latex through a pipe and stirring of the SIS latex in a preparation tank.

Further, the SIS latex may contain additives generally used in the field of latex, such as a pH adjuster, a defoamer, a preservative, a cross-linking agent, a chelating agent, an oxygen scavenger, a dispersant, and an antioxidant. Examples or pH adjusters include the same pH adjusters as those described above for the synthetic polyisoprene. Preferred are alkali metal hydroxides and ammonia. Although the pH of the SIS latex in this case is not particularly limited, it is preferable, as described later, that the pH of a latex composition prepared using materials including the SIS latex be controlled to 10 or mere before aging of the latex under predetermined conditions.

The content of styrene units in styrene blocks of the SIS contained in the SIS latex thus obtained is preferably 70 to 100 wt %, more preferably 90 to 100 wt %, further more preferably 100 wt % with respect to the total monomer units.

Further, the content of isoprene units in isoprene blocks of the SIS is preferably 70 to 100 wt %, more preferably 90 to 100 wt %, further more preferably 100 wt % with respect to the total monomer units.

The content ratio of styrene units to isoprene units in the SIS is typically in the range of 1:99 to 90:10, preferably 3:97 to 70:30, more preferably 5:95 to 50:50, further more preferably 10:90 to 30:70 as a weight ratio of "styrene units:isoprene units".

The weight average molecular weight of the SIS is preferably 10,000 to 1,000,000, more preferably 50,000 to 500,000, further more preferably 100,000 to 300,000 as calibrated against polystyrene standards by gel permeation chromatography. Adjusting the weight average molecular weight of the SIS within the above ranges tends to result in a dip-molded article having improved balance of tensile strength and flexibility, and facilitate the production of the SIS latex.

The volume average particle size of latex particles (SIS particles) in the SIS latex is preferably 0.1 to 10 μm, more preferably 0.5 to 3 μm, further more preferably 0.5 to 2.0 μm. Adjusting the volume average particle size of the latex particles within the above ranges leads to appropriate viscosity of the latex to ensure ease of handling, and can suppress formation of a film on the surface of the latex during storage of the SIS latex.

Further, a nitrile group-containing conjugated diene copolymer can also be used as the conjugated diene polymer as described above.

The nitrile group-containing conjugated diene copolymer is a copolymer formed by copolymerization of an ethylenically unsaturated nitrile monomer with a conjugated diene monomer, and may be any of copolymers formed by copolymerization of these monomers with a different ethylenically unsaturated monomer that is copolymerizable with the former monomers and is used as needed in addition to the former monomers.

Examples of such conjugated diene monomers include 1,3-butadiene, isoprene, 2,3-dimethyl-1,3-butadiene, 2-ethyl-1,3-butadiene, 1,3-pentadiene, chloroprene, and the like. Among these, 1,3-butadiene and isoprene are preferable, and 1,3-butadiene is more preferable. One of these conjugated diene monomers can be used alone, or two or more of them can be used in combination. The content of conjugated diene monomer units formed from such conjugated diene monomer(s) in the nitrile group-containing conjugated diene copolymer is preferably 56 to 78 wt %, more preferably 56 to 73 wt %, further more preferably 56 to 68 wt %. Adjusting the content of conjugated diene monomer units within the above ranges can result in a dip-molded article having sufficient tensile strength and having a further improved texture and further improved elongation.

Such ethylenically unsaturated nitrile monomers may be any ethylenically unsaturated monomers containing a nitrile group without limitation. Examples thereof include acrylonitrile, methacrylonitrile, fumaronitrile, α-chloroacrylonitrile, α-cyanoethylacrylonitrile, and the like. Among these, acrylonitrile and methacrylonitrile are preferable, and acrylonitrile is more preferable. One of these ethylenically unsaturated nitrile monomers can be used alone, or two or more of them can be used in combination. The content of ethylenically unsaturated nitrile monomer units formed from such ethylenically unsaturated nitrile monomer(s) in the nitrile group-containing conjugated diene copolymer is preferably 20 to 40 wt %, more preferably 25 to 40 wt %, further more preferably 30 to 40 wt%. Adjusting the content of ethylenically unsaturated nitrile monomer units within the above ranges can result in a dip-molded article having sufficient tensile strength and having a further improved texture and further improved elongation.

Examples of different ethylenically unsaturated monomers that are copolymerizable with the conjugated diene monomer and the ethylenically unsaturated nitrile monomer include ethylenically unsaturated carboxylic acid monomers that are ethylenically unsaturated monomers containing a carboxyl group; vinyl aromatic monomers such as styrene, alkyl styrenes, and vinylnaphthalene; fluoroalkyl vinyl ethers such as fluoroethyl vinyl ether; ethylenically unsaturated amide monomers such as (meth)acrylamide, N-methylol (meth)acrylamide, N,N-dimethylol (meth)acrylamide, N-methoxymethyl (meth)acrylamide, and N-propoxymethyl (meth)acrylamide; ethylenically unsaturated carboxylic acid ester monomers such as methyl (meth)acrylate, ethyl (meth) acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth) acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth) acrylate; cross-linkable monomers such as divinylbenzene, polyethylene glycol di(meth) acrylate, polypropylene glycol di(meth)acrylate, trimethylolpropane tri(meth)acrylate, and pentaerythritol (meth) acrylate; and the like. One of these ethylenically unsaturated monomers can be used alone, or two or more of them can be used in combination.

Any ethylenically unsaturated carboxylic acid monomer can be selected without limitation as long as it is an ethylenically unsaturated monomer having a carboxyl group. Examples thereof include ethylenically unsaturated monocarboxylic acid monomers such as acrylic acid and methacrylic acid; ethylenically unsaturated polyvalent carboxylic acid monomers such as itaconic acid, maleic acid, and fumaric acid; ethylenically unsaturated polyvalent carboxylic acid anhydrides such as maleic anhydride and citraconic anhydride; ethylenically unsaturated polyvalent carboxylic acid partial ester monomers such as monobutyl fumarate monobutyl maleate, and mono-2-hydroxypropyl maleate; and the like. Among these, ethylenically unsaturated monocarboxylic acids are preferable, and methacrylic acid is particularly preferable. The ethylenically unsaturated carboxylic acid monomers can also be used as alkali metal salts or ammonium salts. Further, one of these ethylenically unsaturated carboxylic acid monomers can be used alone, or two or more of them can be used in combination. The content of ethylenically unsaturated carboxylic acid monomer units formed from such an ethylenically unsaturated carboxylic acid monomer in the nitrile group-containing conjugated diene copolymer is preferably 2 to 5 wt %, more preferably 2 to 4.5 wt %, further more preferably 2.5 to 4.5 wt %. Adjusting the content of ethylenically unsaturated carboxylic acid monomer units within the above ranges can result in a dip-molded article having sufficient tear strength and having a further enhanced texture.

The content of other monomer units formed from such different ethylenically unsaturated monomer(s) in the nitrile group-containing conjugated diene copolymer is preferably 10 wt % or less, more preferably 5 wt % or less, further more preferably 3 wt % or less.

The nitrile group-containing conjugated diene copolymer can be obtained by copolymerization of a monomer mixture containing the aforementioned monomers, and a preferred method is copolymerization by emulsion polymerization. As an emulsion polymerization method, a conventionally known method can be employed.

In the emulsion polymerization of the monomer mixture containing the aforementioned monomers, polymerization auxiliary materials generally used, such as an emulsifier, a polymerization initiator, and a molecular weight modifier, can be used. These polymerization auxiliary materials can be added by any method without limitation, and any method such as initial one-time addition, portion-wise addition, and continuous addition may be employed.

Examples of emulsifiers include, but are not limited to, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as alkylbenzene sulfonates including potassium dodecylbenzene sulfonate and sodium dodecylbenzene sulfonate, higher alcohol sulfate salts, and alkyl sulfosuccinates; cationic emulsifiers such as alkyl trimethyl ammonium chlorides, dialkyl ammonium chlorides, and benzyl ammonium chloride; copolymerizable emulsifiers such as sulfo esters of α,β-unsaturated carboxylic acids, sulfate esters of α,β-unsaturated carboxylic acids, and sulfoalkyl aryl ethers; and the like. Among these, anionic emulsifiers are preferable, alkylbenzene sulfonates are more preferable, and potassium dodecylbenzene sulfonate and sodium dodecylbenzene sulfonate are particularly preferable. One of these emulsifiers can be used alone, or two or more of them can be used in combination. The amount of emulsifier(s) used is preferably 0.1 to 10 parts by weight with respect to 100 parts by weight of the monomer mixture.

Examples of polymerization initiators include, but are not limited to, inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; azo compounds such as azobisisobutyronitrile, azobis-2,4-dimethylvaleronitrile, and methyl azobisisobutyrate; and the like. One of these polymerization initiators can be used alone, or two or more of them can be used in combination. The amount of such polymerization initiator(s) used is preferably 0.01 to 10 parts by weight, more preferably 0.01 to 2 parts by weight with respect to 100 parts by weight of the monomer mixture.

Further, the peroxide initiators can be used in combination with reductants as redox polymerization initiators. Examples of such reductants include, but are not limited to, compounds containing reduced metal ions such as ferrous sulfate and cuprous naphthenate; sulfonic acid compounds such as sodium methanesulfonate; amine compounds such as dimethylaniline; and the like. One of these reductants can be used alone, or two or more of them can be used in combination. The amount of reductant(s) used is preferably 3 to 1000 parts by weight with respect to 100 parts by weight of the peroxides.

The amount of water used in the emulsion polymerization is preferably 80 to 600 parts by weight, particularly preferably 100 to 200 parts by weight with respect to 100 parts by weight of all monomers used.

Examples of methods of adding the monomers include a method of adding the monomers to be used into a reactor all at once, a method of adding monomers continuously or intermittently as the polymerization proceeds, a method of adding a portion of the monomers to react the monomers to a specific conversion ratio and then adding the remaining monomers continuously or intermittently to complete polymerization, and the like. Any one of these methods maybe employed. In the case of mixing the monomers and thereafter adding the mixture continuously or intermittently, the composition of the mixture may be fixed or varied. Further, the monomers may be mixed in advance and then added into the reactor, or may be separately added into the reactor.

Further, polymerization auxiliary materials such as a chelating agent, a dispersant, a pH adjuster, an oxygen scavenger, and a particle size modifier can be used as needed, and both of the type and the amount of these polymerization auxiliary materials used are not particularly limited.

The polymerization temperature during the emulsion polymerization, although not particularly limited, is typically 3 to 95° C., preferably 5 to 60° C. The polymerization time is about 5 to 40 hours.

The monomer mixture is subjected to emulsion polymerization as described above, and the polymerization reaction is stopped by cooling the polymerization system or adding a polymerization terminator at the time when a predetermined polymerization conversion ratio is reached. The polymerization conversion ratio at which the polymerization reaction is stopped is preferably 90 wt % or more, more preferably 93 wt % or more.

Examples of polymerization terminators include, but are not limited to, hydroxylamine, hydroxyamine sulfate, diethylhydroxylamine, hydroxyaminesulfonic acid and alkali metal salts thereof, sodium dimethyldithiocarbamate, hydroquinone derivatives, catechol derivatives, and aromatic hydroxydithiocarboxylic acids such as hydroxydimethylbenzenethiocarboxylic acid, hydroxydiethylbenzenedithiocarboxylic acid, and hydroxydibutylbenzenedithiocarboxylic acid, and alkali metal salts thereof, and the like. The amount of such a polymerization terminator used is preferably 0.05 to 2 parts by weight with respect to 100 parts by weight of the monomer mixture.

After the polymerization reaction is stopped, as needed, unreacted monomers are removed, and the solids content and the pH of the product are adjusted, so that a latex of the nitrile group-containing conjugated diene copolymer can be obtained.

Further, an antioxidant, a preservative, an antibacterial agent, a dispersant, and the like may be appropriately added to the latex of the nitrite group-containing conjugated diene copolymer as required.

The number average particle size of the latex of the nitrile group-containing conjugated diene copolymer is preferably 60 to 300 nm, more preferably 80 to 150 nm. The particle size can be adjusted to a desired value, for example, by controlling the amounts of emulsifier(s) and polymerization initiator(s) used.

As described above, a deproteinized natural rubber (protein-free natural rubber) maybe used as the conjugated diene polymer. One usable deproteinized rubber is that known as so-called “deproteinized natural rubber” obtained by a conventionally known protein removal method such as a method involving decomposing proteins in a natural rubber using agents such as a protease and a surfactant, and removing the proteins by washing, centrifugation, or the like.

Although the conjugated diene polymer used in the present invention can be a synthetic polyisoprene, a styrene-isoprene-styrene block copolymer (SIS), a nitrile group-containing conjugated diene copolymer, a deproteinized natural rubber, or the like as described above, the conjugated diene polymer is not limited to these examples, and a butadiene polymer, a styrene-butadiene copolymer, or the like may be used.

Such a butadiene polymer may be a homopolymer of 1,3-butadiene as a conjugated diene monomer, or may be a copolymer formed by copolymerization of 1,3-butadiene as a conjugated diene monomer with a different ethylenically unsaturated monomer that is copolymerizable with 1,3-butadiene.

Further, such a styrene-butadiene copolymer maybe a copolymer formed by copolymerization of 1,3-butadiene as a conjugated diene monomer with styrene, or may be a copolymer formed by copolymerization of these monomers with a different ethylenically unsaturated monomer that is copolymerizable with the former monomers and is used as required in addition to the former monomers.

The carboxy-modified conjugated diene polymer constituting the carboxy-modified conjugated diene polymer latex used in the present invention can be obtained by modifying the conjugated diene polymer described above with a monomer having a carboxyl group. In the case where an ethylenically unsaturated carboxylic acid monomer is used as a different copolymerizable ethylenically unsaturated monomer when producing a nitrile group-containing conjugated diene copolymer, the modification with a monomer having a carboxyl group (described later) is not always necessary because the nitrile group-containing conjugated diene copolymer produced is already carboxy-modified.

The conjugated diene polymer can be modified with the monomer having a carboxyl group by any method without limitation. Examples thereof include graft-polymerization of the monomer having a carboxyl group onto the conjugated diene polymer in an aqueous phase. Any method can be used without limitation to graft-polymerize the monomer having a carboxyl group onto the conjugated diene polymer in an aqueous phase, and conventionally known methods may be used. One preferred example is that after adding the monomer having a carboxyl group and a graft polymerization catalyst to the conjugated diene polymer latex, the monomer having a carboxyl group is reacted with the conjugated diene polymer in the aqueous phase.

Examples of graft polymerization catalysts include, but are not limited to, inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide; azo compounds such as 2,2'-azobisisobutyronitrile, azobis-2,4-dimethylvaleronitrile, and methyl azobisisobutyrate, and the like. From the viewpoint of producing a dip-molded article having further enhanced tensile strength, organic peroxides are preferable, and 1,1,3,3-tetramethylbutyl hydroperoxide is particularly preferable. One of these graft polymerization catalysts may be used alone, or two or more of them may be used in combination.

One of the aforementioned graft polymerization catalysts can be used alone, or two or more of them can be used in combination. Although the amount of the graft polymerization catalyst used varies depending on its type, the amount is preferably 0.1 to 10 parts by weight, more preferably 0.2 to 5 parts by weight with respect to 100 parts by weight of the conjugated diene polymer. Further, the graft polymerization catalyst can be added by any method without limitation, and any known addition method such as one-time addition, portion-wise addition, or continuous addition can be used.

Organic peroxides can be used in combination with reductants as redox polymerization initiators. Examples of such reductants include, but are not limited to, compounds containing reduced metal ions such as ferrous sulfate and cuprous naphthenate; sulfinates such as sodium hydroxymethanesulfinate; amine compounds such as dimethylaniline; and the like. One of these reductants may be used alone, or two or more of them may be used in combination.

The amount of reductant(s) added, although not particularly limited, is preferably 0.01 to 1 part by weight with respect to 1 part by weight of organic peroxide(s).

Any method for adding the organic peroxide and the reductant can be used without limitation, and known addition methods such as one-time addition, portion-wise addition, and continuous addition can be used.

Although the reaction temperature during the reaction of the monomer having a carboxyl group with the conjugated diene polymer is not particularly limited, it is preferably 15 to 80° C., more preferably 30 to 50° C. The reaction time for the reaction of the monomer having a carboxyl group with the conjugated diene polymer may be appropriately set according to the aforementioned reaction temperature, and is preferably 30 to 300 minutes, more preferably 60 to 120 minutes.

The solids content of the conjugated diene polymer latex before the reaction of the monomer having a carboxyl group with the conjugated diene polymer, although not particularly limited, is preferably 5 to 60 wt %, more preferably 10 to 40 wt %.

Examples of monomers having a carboxyl group include ethylenically unsaturated monocarboxylic acid monomers such as acrylic acid and methacrylic acid; ethylenically unsaturated polyvalent carboxylic acid monomers such as itaconic acid, maleic acid, fumaric acid, and butene tricarboxylic acid; ethylenically unsaturated polyvalent carboxylic acid partial ester monomers such as monobutyl fumarate, monobutyl maleate, and mono-2-hydroxypropyl maleate; polyvalent carboxylic acid anhydrides such as maleic anhydride and citraconic anhydride; and the like. Ethylenically unsaturated monocarboxylic acid monomers are preferable, acrylic acid and methacrylic acid are more preferable, and methacrylic acid is particularly preferable because further remarkable effects of the present invention are achieved. One of these monomers may be used alone, or two or more of them may be used in combination. It should be noted that the aforementioned carboxyl group is intended to encompass forms of salts with alkali metals, ammonia, and the like.

The amount of the monomer having a carboxyl group used is preferably 0.01 to 100 parts by weight, more preferably 0.01 to 40 parts by weight, further more preferably 0.5 to 20 parts by weight, still further more preferably 2 to 5 parts by weight with respect to 100 parts by weight of the conjugated diene polymer. The use of the amount of the monomer having a carboxyl group used within the above ranges results in a latex composition that has more appropriate viscosity and therefore is easy to transfer, and a dip-molded article formed using the resulting latex composition has further enhanced tear strength.

The monomer having a carboxyl group can be added to the conjugated diene polymer latex by any method without limitation, and any known addition method such as one-time addition, portion-wise addition, or continuous addition can be used.

The degree of modification of the carboxy-modified conjugated diene polymer with the monomer having a carboxyl group may be appropriately controlled according to the intended use of the conjugated diene latex composition to be obtained, but is preferably 0.01 to 10 wt %, more preferably 0.2 to 5 wt %, further more preferably 0.3 to 3 wt %, particularly preferably 0.4 to 2 wt %, for example 0.4 to 1 wt %. The degree of modification is represented by the formula below.

$$\text{Degree of modification } (wt\ \%) = (X/Y) \times 100$$

In the above formula, X represents the weight of units of the monomer having a carboxyl group in the carboxy-modified conjugated diene polymer, and Y represents the weight of the carboxy-modified conjugated diene polymer. X can be determined, for example, by performing $^{1}$H-NMR analysis on the carboxy-modified conjugated diene polymer and performing a calculation based on the results of the $^{1}$H-NMR analysis, or by determining its acid content by neutralization titration and performing a calculation based on the resulting acid content.

The carboxy-modified conjugated diene polymer latex used in the present invention may contain additives that are generally used in the field of latex, such as a pH adjuster, a defoamer, a preservative, a chelating agent, an oxygen scavenger, a dispersant, and an antioxidant.

Examples of pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides and ammonia.

The carboxy-modified conjugated diene polymer particles dispersed in water in the carboxy-modified conjugated diene polymer latex used in the present invention has a volume average particle size of 500 to 2,000 nm, preferably 650 to 1,500 nm, more preferably 800 to 1,200 nm. Adjusting the volume average particle size of the carboxy-modified conjugated diene polymer particles within the above ranges leads to producing a dip-molded article having excellent tensile strength, tensile elongation, and tear strength, and exhibiting a suppressed occurrence of a structural defect such as a pinhole even in the case where the dip-molded article has a thickness of as thin as 0.02 to 0.19 nm. Too small a volume average particle size of the carboxy-modified conjugated diene polymer particles may result in a dip-molded article having poor tensile strength and poor tear strength. On the other hand, too large a volume average particle size of the carboxy-modified conjugated diene polymer particles may cause the occurrence of aggregates during aging of the latex composition. The volume average particle size can be measured by a light scattering diffraction particle measuring apparatus or a laser diffraction particle size distribution measuring apparatus.

The latex composition used in the present invention preferably contains a sulfur-based vulcanizing agent in addition to the carboxy-modified conjugated diene polymer latex described above.

Examples of the sulfur-based vulcanizing agent include, but are not limited to, sulfur such as powder sulfur, flowers of sulfur, precipitated sulfur, colloid sulfur, surface-treated sulfur, and insoluble sulfur; sulfur-containing compounds such as sulfur chloride, sulfur dichloride, morpholine disulfide, alkyl phenol disulfides, caprolactam disulfide (N,N'-dithio-bis(hexahydro-2H-azepinone-2)), phosphorus-containing polysulfides, polymer polysulfides, and 2-(4'-morpholinodithio)benzothiazole; and the like. Among these, sulfur can be preferably used. One of these sulfur-based vulcanizing agents may be used alone, or two or more of them may be used in combination.

Although the amount of the sulfur-based vulcanizing agent used is not specifically limited, it is preferably 0.01 to 3 parts by weight, more preferably 0.1 to 1.5 parts by weight, further more preferably 0.1 to 0.8 parts by weight, still further more preferably 0.1 to 0.6 parts by weight, particularly preferably 0.2 to 0.6 parts by weight with respect to 100 parts by weight of the carboxy-modified conjugated diene polymer contained in the latex composition. Adjusting the content of the sulfur-based vulcanizing agent within the above ranges can result in a dip-molded article which can avoid delayed (Type IV) allergic reactions and has further enhanced tensile strength.

The latex composition used in the present invention preferably contains a vulcanization accelerator in addition to the carboxy-modified conjugated diene polymer latex and sulfur-based vulcanizing agent described above. As the vulcanization accelerator, a xanthogen compound is preferably used from the viewpoint of producing a dip-molded article which can suitably avoid delayed (Type TV) allergic reactions.

Although the xanthogen compound is not particularly limited, examples thereof include xanthic acids, xanthates, xanthogen disulfides (compounds with two xanthic acid molecules bound via a sulfur atom or the like), xanthogen polysulfides (compounds with three or more xanthic acid molecules bound via sulfur atoms or the like), and the like.

Such xanthates are not particularly limited, and may be any compounds having a xanthate structure. Examples thereof include compounds represented by the general formula (ROC(=S)S)x-Z (where R represents a linear or branched hydrocarbon, Z represents a metal atom, and x represents a numerical value that matches the valence of Z and is generally 1 to 4, preferably 2 to 4, particularly preferably 2).

Although xanthates represented by the general formula (ROC(=S)S)x-Z are not particularly limited, examples thereof include zinc dimethyl xanthate, zinc diethyl xanthate, zinc dipropyl xanthate, zinc diisopropyl xanthate, zinc dibutyl xanthate, zinc dipentyl xanthate, zinc dihexyl xanthate, zinc diheptyl xanthate, zinc dioctyl xanthate, zinc di(2-ethylhexyl) xanthate, zinc didecyl xanthate, zinc didodecyl zanthate, potassium dimethyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Among these, xanthates with x in the general formula (ROC(°S)S)x-Z being 2 or more are preferable, isopropyl xanthates and butyl xanthates are more preferable, and zinc diisopropyl xanthate and zinc dibutyl xanthate are particularly preferable. One of these xanthates may be used alone, or two or more of them may be used in combination.

Xanthogen disulfides are compounds with two xanthic acid molecules bound via sulfur atoms or the like. Examples thereof include, but are not limited to, dimethyl xanthogen disulfide, diethyl xanthogen disulfide, diisopropyl xanthogen disulfide, dibutyl xanthogen disulfide, dimethyl xanthogen polysulfide, diethyl xanthogen polysulfide, diisopropyl xanthogen polysulfide, dibutyl xanthogen polysulfide, and the like. Among these, diisopropyl xanthogen disulfide and dibutyl xanthogen disulfide are preferable.

Xanthogen polysulfides are compounds with three or more xanthic acid molecules bound via sulfur atoms or the like, and examples thereof include xanthogen trisulfides with three xanthic acid molecules bound via sulfur, xanthogen tetrasulfides with four xanthic acid molecules bound via sulfur, xanthogen pentasulfides with five xanthic acid molecules bound via sulfur, and the like.

Although the latex composition may contain one of these xanthogen compounds alone, the latex composition preferably contains a combination of two or more of them. For example, in the case where the latex composition contains a xanthic acid, the latex composition may contain two or more xanthogen compounds as a result of conversion of a portion of the xanthic acid to a salt form. Alternatively, a portion of the xanthic acid mixed in the latex composition may be present in the form of a xanthogen disulfide or a xanthogen polysulfide due to the action of the sulfur-based vulcanizing agent in the latex composition. Likewise, also in the case where the latex composition contains a xanthate, a xanthogen disulfide, or a xanthogen polysulfide, these each may be present in the form of any one of a xanthic acid, a xanthate, a xanthogen disulfide, and a xanthogen polysulfide.

Further, in the present invention, a vulcanization accelerator other than xanthogen compounds may be used in place of the xanthogen compound or together with the xanthogen compound.

Examples of usable vulcanization accelerators other than the xanthogen compound include vulcanization accelerators conventionally used in dip molding, and examples thereof include dithiocarbamic acid compounds, such as diethyldithiocarbamic acid, dibutyldithiocarbamic acid, di-2-ethylhexyldithiocarbaramic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio) benzothiazole, 2-(N,N-diethylthiocarbaylthio) benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazyl mercaptomethyl)urea, and the like. One of these vulcanization accelerators may be used alone, or two or more of them may be used in combination.

The amount of the vulcanization accelerator used (in the case where a plurality of vulcanization accelerators is present, the total amount thereof) is preferably 0.01 to 10 parts by weight, more preferably 0.1 to 7 parts by weight, further more preferably 0.5 to 5 parts by weight, still further more preferably 1 to 3 parts by weight with respect to 100 parts by weight of the carboxy-modified conjugated diene polymer contained in the latex. The use of the vulcanization accelerator in an amount within the above ranges can suppress an increase in the hardness of the resulting dip-molded article while further enhancing tensile strength thereof.

In the case where the latex composition used in the present invention contains the xanthogen compound as the vulcanization accelerator, an activating agent may be added to the carboxy-modified conjugated diene polymer latex described above as needed.

In the case where an activating agent is added to the latex composition, the activating agent as well as the xanthogen compound acts as a vulcanization accelerator when a dip-molded article is formed from the latex composition by vulcanizing the carboxy-modified conjugated diene polymer in the latex composition by the action of the sulfur-based vulcanizing agent. Consequently, the resulting dip-molded article has further enhanced tear strength.

Although such an activating agent is not particularly limited, a metal compound is preferably used to further enhance the tear strength of the resulting dip-molded article. Examples of such metal compounds include, but are not limited to, metal oxides, metal compounds having one or more carbon atoms, and the like. Any metal may be selected as a metal component of such metal compounds without limitation. Preferred is a typical metal (at least one element selected from the group consisting of the elements of Groups 1, 2, 12, 13, 14, 15, 16, 17, and 18). More preferred are the elements of Groups 2, 12, 13, and 14, further more preferred are zinc, magnesium, calcium, aluminum, and lead, particularly preferred are zinc, magnesium, and calcium, and most preferred is zinc. One of these metal compounds may be used alone, or two or more of these may be used in combination.

Although metal oxides are not particularly limited, zinc oxide, magnesium oxide, titanium oxide, calcium oxide, lead oxide, iron oxide, copper oxide, tin oxide, nickel oxide, chromium oxide, cobalt oxide, and aluminum oxide are preferred from the viewpoint of providing a dip-molded article having further enhanced tear strength. More preferred is zinc oxide.

Although metal compounds having one or more carbon atoms are not particularly limited, carbonates, hydrogen carbonates, hydroxides, and organic metal compounds are preferred from the viewpoint of providing a dip-molded article having further enhanced tear strength. More preferred are carbonates, hydrogen carbonates, and organic metal compounds. Among these, inorganic salts such as carbonates and hydrogen carbonates are particularly preferred from the viewpoint of high stability and high availability of the compounds.

The amount of the activating agent used is preferably 0.01 to 10 parts by weight, more preferably 0.1 to 5 parts by weight, further more preferably 1 to 3 parts by weight with respect to 100 parts by weight of the carboxy-modified conjugated diene polymer contained in the latex composition. The use of the activating agent in an amount within the above ranges can result in a dip-molded article having further enhanced tear strength.

The activating agent can be added in any manner without limitation as long as the carboxy-modified conjugated diene polymer latex and the activating agent are finally mixed.

The latex composition can further contain optional compounding agents including an antioxidant, a dispersant, a reinforcer such as carbon black, silica, or talc, a filler such as calcium carbonate or a clay, an ultraviolet absorber, and a plasticizer.

Examples of antioxidants include sulfur atom-free phenolic antioxidants such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl) propionate, styrenated phenol, 2,2'-methylene-bis (6-α-methyl-benzyl-p-cresol), 4,4'-methylenebis(2,6-di-t-butylphenol), 2,2'-methylene-bis(4-methyl-6-t-butylphenol), alkylated bisphenols, and a butylated reaction product of p-cresol with dicyclopentadiene; thiobisphenol antioxidants such as 2,2'-thiobis-(4-methyl-6-t-butylphenol), 4,4'-thiobis-(6-t-butyl-o-cresol), and 2,6-di-t-butyl-4-(4,6-bis (octylthio)-1,3,5-triazin-2-ylamino)phenol; phosphite ester antioxidants such as tris (nonylphenyl) phosphite, diphenylisodecyl phosphite, and tetraphenyl dipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isoproyl-N'-phenyl-p-phenylenediamine, and butyl aldehyde-aniline condensation products; quinoline antioxidants such as 6-ethoxy-2,2,4-trimethyl-1,2-dihydroquinoline; hydroquinone antioxidants such as 2,5-di-(t-amyl)hydroquinone; and the like. One of these antioxidants can be used alone, or two or more of them can be used in combination.

The content of such antioxidant(s) is preferably 0.05 to 10 parts by weight, more preferably 0.1 to 5 parts by weight, further more preferably 1 to 3 parts by weight with respect to 100 parts by weight of the carboxy-modified conjugated diene polymer.

These compounding agents can be mixed in the latex composition by any method without limitation. Examples thereof include a method involving preparing a composition containing the carboxy-modified conjugated diene polymer latex, the sulfur-based vulcanizing agent, and the vulcanization accelerator, and then mixing the optional compounding agents in the prepared composition using a dispersing machine such as a ball mill, a kneader, or a disperser. Some of the compounding agents may be added after aging (described later).

The solids content of the latex composition used in the present invention is preferably 1 to 40 wt % more preferably 3 to 35 wt %, further more preferably 5 to 30 wt %, particularly preferably 10 to 20 wt %. Adjusting the solids content of the latex composition within the above ranges can lead to producing a late composition which can maintain high stability against aggregation of the latex and can provide a dip-molded article having excellent tensile strength, tensile elongation, and tear strength even in the case where the dip-molded article has a thickness of as thin as 0.02 to 0.1.9 mm.

In the present invention, from the viewpoint of producing a dip-molded article having sufficient mechanical properties, the aforementioned latex composition is preferably subjected to aging (pre-crosslinking or pre-vulcanization) before being dip molded. The time for aging (pre-vulcanization) is preferably 8 to 120 hours, more preferably 24 to 72 hours although not particularly limited thereto. The temperature during aging (pre-vulcanization) is preferably 20 to 40° C. although not particularly limited thereto. After a predetermined time of aging (pre-vulcanization) before use, the aforementioned latex composition may be successively dip-molded while the conditions for aging (pre-vulcanization) are maintained (aging (pre-vulcanization) is continued). In this case, the aging (pre-vulcanization) time and the aging (pre-vulcanization) temperature may be controlled within the aforementioned ranges.

Method for Producing Dip-Molded Article

The method for producing a dip-molded article according to the present invention comprising seeps of:

- immersing a mold for dip molding in a coagulant solution to deposit a coagulant on the mold for dip morning;
- providing the latex composition described above;
- immersing the mold for dip molding having the coagulant deposited thereon in the latex composition to obtain a dip-molded article having a thickness of 0.02 to 0.19 mm.

According to the method for producing the dip-molded article according to the present invention, using the carboxy-modified conjugated diene polymer latex having a volume average particle size controlled within the range of 500 to 2,000 nm as the latex constituting the latex composition and control ling the thickness of the dip-molded article within the range of 0.02 to 0.19 mm can provide a dip-molded article having excellent tensile strength, tensile elongation, and tear strength, and exhibiting a suppressed occurrence of a structural defect such as a pinhole even in the case where the dip-molded article has such a relatively small thickness.

The thickness of the dip-molded article obtained by the production method according to the present invention is 0.02 to 0.19 mm, preferably 0.02 to 0.15 mm, more preferably 0.02 to 0.10 mm, particularly preferably greater than or equal to 0.02 mm and less than 0.08 mm.

According to the production method according to the present invention, a dip-molded article having excellent tensile strength, tensile elongation, and tear strength can be produced when the carboxy-modified conjugated diene polymer latex used has a volume average particle size controlled within the range of 500 to 2,000 nm, even in the case where the dip-molded article has a thickness controlled within the above ranges. The thickness of the dip-molded article can be calculated, for example, as follows. Specifically, the thickness of the dip-molded article can be calculated by first, selecting any given five points within 3 cm from a location on the dip-molded article corresponding to a location on the mold for dip molding (described later), which is in contact with the coagulant solution for the longest time (normally, a most top part of the mold for dip molding) when the mold for dip molding is immersed in the coagulant solution, and next, measuring the thicknesses of the five selected points to determine the arithmetic average of the five measured points.

Although the mold for dip molding used in the present invention is not particularly limited, various molds such as those made of materials such as ceramics, glass, metal, and plastic can be used. The shape of the mold for dip molding can be a desired shape that mates the shape of the final product.

From the viewpoint of being able to suitably control the thickness of the resulting dip-molded article within the range of 0.02 to 0.19 mm, the mold for dip molding having a non-roughened (not ground processed or the like, for example) surface is preferably used. Specifically, a mold for dip molding having a smooth surface is preferably used. The surface roughness Ra of the mold for dip molding is preferably 0.01 to 100 μm, more preferably 0.1 to 50 μm, further more preferably 0.5 to 30 μm, still further more preferably 1 to 5 μm. The surface roughness of a roughened glass mold is generally several hundred to several thousand μm or so.

Specific examples of the coagulant include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts can be used alone, or two or more of them can be used in combination.

Such coagulants are generally used as solutions in water, an alcohol, or a mixture thereof, and are preferably used in the form of aqueous solutions. Such aqueous solutions may further contain a water-soluble organic solvent such as methanol or ethanol, and a nonionic surfactant. Although the concentration of the coagulant varies depending on the type of the water-soluble polyvalent metal salt, the concentration is preferably 0.1 to 20 wt %, more preferably 0.2 to 15 wt %, further more preferably 0.3 to 10 wt %, particularly preferably 0.5 to 6 wt %, for example, 1 to 4 wt %. Adjusting the concentration of the coagulant within the above ranges can result in a dip-molded article having a thickness suitably controlled.

The immersion time for immersing the mold for dip molding in the coagulant solution is preferably 0.1 to 20 seconds, more preferably 0.5 to 10 seconds, further more preferably 1 to 6 seconds, particularly preferably 1 to 4 seconds. Immersing the mold in the coagulant solution for an immersion time controlled within the above ranges can result in a dip-molded article having a thickness suitably controlled.

The mold for dip molding is preferably heated before immersing the mold for dip molding in the coagulant solution. The temperature of the mold for dip molding at this time is preferably 20 to 100° C., more preferably 30 to 80° C., further more preferably 35 to 70° C., particularly preferably 40 to 65° C. Adjusting the temperature of the mold for dip molding within the above ranges can result in a dip-molded article having a thickness suitably controlled.

The immersion time for immersing the mold for dip molding having the coagulant deposited thereon in the latex composition is preferably 1 to 20 seconds, more preferably 1 to 15 seconds, further more preferably 2 to 10 seconds, particularly preferably 3 to 6 seconds. Adjusting the immersion time for immersing in the latex composition within the above ranges can result in a dip-molded article having a thickness suitably controlled.

The mold for dip molding after pulled out of the latex composition is generally heated to dry the deposit formed on the mold for dip molding. The drying conditions may be appropriately selected.

Next, the dip-molded layer deposited on the mold for dip molding is cross-linked by heating. The dip-molded layer can be cross-linked by heat treatment typically at a temperature of 80 to 150° C., preferably for 10 to 130 minutes. As a heating method, external heating methods using infrared rays or heated air or internal heating methods using high-frequency waves can be employed. Among these, externa heating using heated air is preferable. Before the heat treatment, the dip-molded layer may be immersed in water, preferably hot water at 30 to 70° C. for about 1 to 60 minutes to remove water-soluble impurities (such as excess emulsifier and coagulant). Although the removal of water-soluble impurities may be performed after the heat treatment of the dip-molded layer, the removal process is preferably performed before the heat treatment to more efficiently remove the water-soluble impurities.

Then, a dip-molded article is obtained by detaching the dip-molded layer from the mold for dip molding. As a detaching method, a method of peeling the layer from the mold for dip molding by hand or a method of peeling the layer by water pressure or pressure of compressed air can be employed. After the detachment, heat treatment at a temperature of 60 to 120° C. for 10 to 120 minutes may be further performed.

Thus, according to the production method according to the present invention, as mentioned above, using the carboxy-modified conjugated diene polymer latex having a volume average particle size controlled within the range of 500 to 2,000 nm as the latex constituting the latex composition and controlling the thickness of the dip-molded article within the range of 0.02 to 0.19 mm can provide a dip-molded article having excellent tensile strength, tensile elongation, and tear strength, and exhibiting a suppressed occurrence of a structural defect such as a pinhole even in the case where the dip-molded article has such a relatively small thickness. This allows the resulting dip-molded article to be suitably used as, for example, probe covers, condoms, and surgical gloves.

Further, other than the aforementioned, the dip-molded article produced by the production method according to the present invention can be used as medical supplies such as baby bottle nipples, droppers, tubes, water pillows, balloon stalls, and catheters; toys such as balloons, dolls, and balls; industrial supplies such as pressure molding bags and gas storage bags; fingerstalls; and the like.

EXAMPLES

Hereinafter, the present invention will be specifically described with reference to Examples. However, the present invention is not limited to these examples. The "part(s)"

below is on a weight basis unless otherwise specified. The physical properties were measured as follows.

Solids Content

From each sample, 2 g (weight: X2) was accurately weighed on an aluminum dish (weight: X1), followed by drying in a hot air dryer at 105° C. for 2 hours. Subsequently, after cooling in a desiccator, the weight thereof (weight: X3) including the aluminum dish was measured to calculate the solids content according to the following calculation formula.

$$\text{Solids content } (wt\ \%)=(X3-X1)\times 100/X2$$

Degree of Modification of Carboxy-Modified Conjugated Diene Polymer

For carboxy-modified conjugated diene polymers (carboxy-modified synthetic polyisoprenes and carboxy-modified SISs) carboxy-modified conjugated diene copolymer latexes (carboxy-modified synthetic polyisoprene latexes and carboxy-modified SIS latexes), the number of carboxyl groups in each carboxy-modified conjugated diene polymer was determined by neutralization titration using an aqueous sodium hydroxide solution. Then, the degree of modification with a monomer having a carboxyl group was determined using the formula below based on the determined number of carboxyl groups.

$$\text{Degree of modification } (wt\ \%)=(X/Y)\times 100$$

In the above formula, X represents the weight of units of the monomer having a carboxyl group in the carboxy-modified conjugated diene polymer, and Y represents the weight of the carboxy-modified conjugated diene polymer.

Volume Average Particle Size of Carboxy-Modified Conjugated Diene Polymer Particle The volume average particle size of the carboxy-modified conjugated diene polymer particles contained in each carboxy-modified conjugated diene polymer latex was measured by a light scattering diffraction particle measuring apparatus (trade name: "LS-230", manufactured by COULTER Corporation).

Thickness of Dip-Molded Article

Five points were selected for measurement in such a way that each point was within 3 cm from a location on each dip-molded article corresponding to a location which was in contact with the coagulant solution for the longest time (the top of a glass mold) when the glass mold was immersed in a coagulant solution. Then, the thickness at each of the five points selected was measured to determine the arithmetic average or the thickness at the five points measured. The value (unit: mm) obtained was defined as the thickness of the dip-molded article.

Tensile Stress at 500% Elongation, Tensile Strength, and Tensile Elongation of Dip-Molded Article In accordance with ASTM D412, each dip-molded article was punched out using a dumbbell (trade name "SUPER DUMBBELL (type: SDMK-100C)" available from DUMBBELL CO., LTD.) to produce a test piece for tensile strength measurement. The test piece was stretched at a stretching speed of 500 mm/min using a TENSILON Universal Material Testing Instrument (trade name "RTG-1210", available from ORIENTEC CORPORATION) to measure tensile stress at 500% elongation (unit: MPa), tensile strength immediately before break (unit: MPa), and tensile elongation immediately before break (unit: %) A dip-molded article with a lower value of tensile stress at 500% elongation is considered as having a softer texture, and a dip-molded article with a higher tensile strength is considered as having higher mechanical strength.

Tear Strength of Dip-Molded Article

In accordance with ASTM D624-00, each dip-molded article was allowed to stand still in a constant-temperature, constant-humidity room at 23° C. and a relative humidity of 50% for 24 hours or more, and then was punched out using a dumbbell (trade name "Die C", available from DUMBBELL CO., LTD.) to prepare a test piece for tear strength measurement. The test piece was stretched at a stretching speed of 500 mm/min using a TENSILON Universal Material Testing Instrument (trade name "RTG-1210", available from A&D Company, Limited) to measure tear strength (unit: N/mm). A dip-molded article with a higher tear strength is considered as having higher mechanical strength.

Number of Pinholes in Dip-Molded Article

The number of pinholes in each dip-molded article was counted by cutting open a piece of the dip-molded article into a sheet, and observing the sheet surface with a magnifying lens while back-lighting the sheet from its backside. The number of pinholes per piece of the dip-molded article was defined as the number of pinholes of the dip-molded article.

Example 1

Production of Carboxy-Modified Synthetic Polyisoprene (A-1) Latex

Synthetic polyisoprene (trade name "NIPOL IR2200L", available from Zeon Corporation) was mixed with n-hexane (boiling point: 69° C.), and was dissolved therein by heating to 60° C. with stirring to prepare an n-hexane solution (a) of the synthetic polyisoprene having a synthetic polyisoprene concentration or 15 wt %.

Meanwhile, potassium rosinate was added to water, and was dissolved therein by heating to 60° C. Thus, an emulsifier aqueous solution (b) (concentration: 1.5 wt %) was prepared.

Next, the n-hexane solution (a) of the synthetic polyisoprene and the emulsifier aqueous solution (b) prepared above were mixed using a mixer (trade name "Multi Line mixer MS26-MMR-5.5L", available from SATAKE CHEMICAL EQUIPMENT MFG., LTD.) in such proportions that the amount of potassium rosinate in the emulsifier aqueous solution (b) was 10 parts with respect to 100 parts of the synthetic polyisoprene in the n-hexane solution (a) of the synthetic polyisoprene. The mixture was then mixed and emulsified at a rotational speed of 4100 rpm using an emulsifying apparatus (trade name "MILDER MDN310", available from Pacific Machinery & Engineering Co., Ltd.) to give an emulsified dispersion (c). In this process, the total feed flow rate of the n-hexane solution (a) of the synthetic polyisoprene and the emulsifier aqueous solution (b) was controlled at 2,000 kg/hr, the temperature was controlled at 60° C., and the back pressure (gauge pressure) was controlled at 0.5 MPa.

Subsequently, the emulsified dispersion (c) was heated to 80° C. under a reduced pressure of −0.01 to −0.09 MPa (gauge pressure) to distill off n-hexane and afford an aqueous dispersion (d) of the synthetic polyisoprene. In this process, a defoamer (trade name "SM5515", available from Dow Corning Toray Co., Ltd.) was continuously added by spraying the defoamer in an amount of 300 ppm by weight with respect to the synthetic polyisoprene in the emulsified dispersion (c). In the process of distilling off n-hexane, the emulsified dispersion (c) was adjusted to 70 vol % or less of the tank volume, and was gradually stirred at 60 rpm using a three-bladed inclined paddle as a stirring blade.

After the completion of distilling off of n-hexane, the aqueous dispersion (d) of the synthetic polyisoprene obtained was concentrated by centrifugation at 8,000 to 9,000 G using a continuous centrifuge (trade name "SRG510", available from Alfa Laval AB) to give a synthetic polyisoprene latex (e) with a solids content of 60 wt % as a light liquid. The conditions for centrifugation were as follows: the solids content of the aqueous dispersion (d) before centrifugation was 8 wt %; the flow rate during continuous centrifugation was 1300 kg/hr; and the back pressure (gauge pressure) of the centrifuge was 0.1 MPa.

Subsequently, after dilution with 130 parts of distilled water with respect to 100 parts of the synthetic polyisoprene in the synthetic polyisoprene latex (e) thus obtained, a solution of 0.8 parts (with respect to 100 parts of the synthetic polyisoprene) of a sodium salt of a condensation product of β-naphthalene sulfonic acid and formalin (trade name "DEMOL T-45", available from Kao Corporation) as a dispersant diluted with 4 parts (with respect to 100 parts of the synthetic polyisoprene) of distilled water was added to the synthetic polyisoprene latex (e) over 5 minutes. Next, the synthetic polyisoprene latex (e) containing the dispersant was fed into a nitrogen-purged reactor provided with a stirrer, and was warmed to 30° C. with stirring. In another reactor, a diluted solution of methacrylic acid was prepared by mixing 3 parts of methacrylic acid as a carboxyl group-containing compound and 16 parts of distilled water. The diluted solution of methacrylic acid was added over 30 minutes to the reactor controlled at 20° C.

Further, a solution (f) composed of 7 parts of distilled water, 0.32 parts of sodium formaldehyde sulfoxylate (trade name "SFS", available from MITSUBISHI GAS CHEMICAL COMPANY, INC.), and 0.01 parts of ferrous sulfate (trade name "Frost Fe", available from CHELEST CORPORATION) was prepared in another reactor. After the solution (f) was transferred to the former reactor, 0.5 parts of 1,1,3,3-tetramethylbutyl hydroperoxide (trade name "PEROCTA H", available from NOF CORPORATION) was added thereto to allow the contents to react at 20° C. for 1 hour, followed by concentration in a centrifuge to yield a carboxy-modified synthetic polyisoprene (A-1) latex. The resulting carboxy-modified synthetic polyisoprene (A-1) latex was measured for degree of modification in accordance with the method described above to give a degree of modification of 0.5 mol %. The volume average particle size of the carboxy-modified synthetic polyisoprene particles contained in the carboxy-modified synthetic polyisoprene (A-1) latex prepared was 0.91 μm.

Preparation of Latex Composition

On a solids content basis with respect to 100 parts of the carboxy-modified synthetic polyisoprene (A-1) in the resulting synthetic polyisoprene (A-1) latex, 1.5 parts of sulfur, 2.5 parts of zinc diisopropyl xanthate as a vulcanization accelerator, 1.5 parts of zinc oxide as an activating agent, 2 parts of an antioxidant agent (trade name "Wingstay L", available from Goodyear Tire and Rubber Company) were added as aqueous dispersions of the compounding agents to the stirred synthetic polyisoprene (A-1) latex. Subsequently, water was added to adjust the solids content to provide a latex composition. The latex composition prepared was aged (pre-vulcanized) for 48 hours in a temperature-constant water tank controlled at 25° C. to provide a latex composition having a solids content of 10 wt %.

Production of Dip-Molded Article

A glass mold (surface roughness Ra: 2 μm) was washed, followed by preheating in an oven at 40° C. Thereafter, the glass mold was immersed in a coagulant aqueous solution containing 3 wt % of calcium nitrate and 0.05 wt % of polyoxyethylene lauryl ether (trade name "EMULGEN 109P", available from Kao Corporation) for 3 seconds, and was taken out of the coagulant aqueous solution. Subsequently, the glass mold was dried in an oven at 70° C. for 30 minutes or more, thereby allowing the coagulant to deposit on the glass mold, so that the glass mold was coated with the coagulant.

Thereafter, the glass mold coated with the coagulant was taken out of the oven, and was immersed for 6 seconds in the latex composition. Subsequently, the glass mold was air-dried at room temperature for 10 minutes, and was immersed in hot water at 60° C. for 5 minutes to elute water-soluble impurities, thereby forming a dip-molded layer on the glass mold. Thereafter, the dip-molded layer formed on the glass mold was vulcanized by heating in an oven at 130° C. for 30 minutes, followed by cooling to room temperature, and was separated from the glass mold after spreading talc to obtain a dip-molded article. The thickness of the dip-molded folded article obtained was 0.03 mm. Then, the dip-molded article obtained was measured for 500% tensile stress, tensile strength, tensile elongation, tear strength, and the number of pinholes according to the aforementioned methods. The results are shown in Table 1.

Example 2

A dip-molded article was produced in the same manner as in Example 1 except that the immersion time for immersing the glass mold in the coagulant aqueous solution. was changed to 10 seconds, and was likewise evaluated. The results are shown in Table 1. The thickness of the dip-molded article obtained was 0.05 mm.

Example 3

A dip-molded article was produced in the same manner as in Example 2 except that the immersion time for immersing the glass mold coated with the coagulant in the latex composition was changed to 15 seconds, and was likewise evaluated. The results are shown in Table 1. The thickness of the dip-molded article obtained was 0.07 mm.

Example 4

Preparation of Latex Composition

A latex composition was prepared in the same manner as in Example 1 except that the solids content was changed to 20 wt %.

Production of Dip-Molded Article

A glass mold (surface roughness Ra: 2 μm) was washed, followed preheating in an oven at 60° C. Thereafter, the glass mold was immersed in a coagulant aqueous solution containing 6 wt % of calcium nitrate and 0.05 wt % of polyoxyethylene lauryl ether (trade name "EMULGEN 109P", available from Kao Corporation) for 3 seconds, and was taken out of the coagulant aqueous solution. Subsequently, the glass mold was dried in an oven at 70° C. for 30 minutes or more, thereby allowing the coagulant to deposit on the glass-mold, so that the glass mold was coated with the coagulant.

Thereafter, the glass mold coated with the coagulant was taken out of the oven, and was immersed for 6 seconds in the latex composition. Subsequently, the glass mold was air-dried at room temperature for 10 minutes, and was immersed in hot water 60° C. for 5 minutes to elute water-soluble impurities, thereby forming a dip-molded layer on the glass mold. Thereafter, the dip-molded layer formed on the glass mold was vulcanized by heating in an oven at 130° C. for 30 minutes, followed by cooling to room temperature, and was separated from the glass mold after spreading talc to obtain a dip-molded article. The thickness of the dip-molded article obtained was 0.09 mm. The dip-molded article obtained was evaluated in the same manner as in Example 1. The results are shown in Table 1.

Example 5

A latex composition was prepared in the same manner as in Example 1 except that the solids content was chanced to 30 wt %. A dip-molded article was produced in the same manner as in Example 4 except that the latex composition prepared was used and the concentration of the coagulant was changed to 12 wt %, and was likewise evaluated. The results are shown Table 1. The thickness of the dip-molded article obtained was 0.16 mm.

Example 6

A latex composition having a solids content of 10 wt % was prepared in the same manner as in Example 1 except that the amount of the aqueous dispersion of sulfur used was changed so that the amount of sulfur contained was 0.5 parts. A dip-molded article was produced in the same manner as in Example 1 except that the latex composition prepared was used, and was likewise evaluated. The results are shown in Table 1. The thickness of the dip-molded article obtained was 0.03 mm.

Comparative Example 1

A dip-molded article was produced in the same manner as in Example 2 except that the synthetic polyisoprene latex (e) was used instead of the carboxy-modified synthetic polyisoprene (A-1) latex, and was likewise evaluated. The results are shown in Table 1. The thickness of the dip-molded article obtained was 0.09 mm.

Comparative Example 2

A dip-molded article was produced in the same manner as in Example 5 except that the synthetic polyisoprene latex (e) was used instead of the carboxy-modified synthetic polyisoprene (A-1) latex, and was likewise evaluated. The results are shown in Table 1. The thickness of the dip-molded article obtained was 0.21 mm.

Comparative Example 3

A dip-molded article was produced in the same manner as in Example 5 except that the concentration of the coagulant was changed to 0.1 wt %, and was likewise evaluated. The results are shown in Table 1. The thickness of the dip-molded article obtained was 0.01 mm.

TABLE 1

| | | | Example | | | | |
|---|---|---|---|---|---|---|---|
| | | | 1 | 2 | 3 | 4 | 5 |
| Immersing step in coagulant solution | | | | | | | |
| Immersion temperature | | (° C.) | 40 | 40 | 40 | 60 | 60 |
| Immersion time | | (seconds) | 3 | 10 | 10 | 3 | 3 |
| Concentration of coagulant | | (wt %) | 3 | 3 | 3 | 6 | 12 |
| Immersion step in latex composition | | | | | | | |
| Latex composition | Conjugated diene polymer | | Carboxy-modified synthetic polyisoprene | Carboxy-modified synthetic polyisoprene | Carboxy-modified synthetic polyisoprene | Carboxy-modified synthetic polyisoprene | Carboxy-modified synthetic polyisoprene |
| | Volume average particle size of conjugated diene polymer particles | (μm) | 0.91 | 0.91 | 0.91 | 0.91 | 0.91 |
| | Solids content | (wt %) | 10 | 10 | 10 | 20 | 30 |
| | Content of sulfur-based vulvanizing agent | (part) | 1.5 | 1.5 | 1.5 | 1.5 | 1.5 |
| Immersion time | | (seconds) | 6 | 6 | 15 | 6 | 6 |
| Evaluations of dip-molded article | | | | | | | |
| Thickness of dip-molded article | | (mm) | 0.03 | 0.05 | 0.07 | 0.09 | 0.16 |
| Tensile stress at 500% elongation of dip-molded article | | (MPa) | 2.1 | 2.1 | 2.2 | 2.1 | 2.3 |
| Tensile strength of dip-molded article | | (MPa) | 25.0 | 24.0 | 23.0 | 23.1 | 23.5 |
| Tensile elongation of dip-molded article | | (%) | 913 | 922 | 890 | 880 | 90.5 |
| Tear strength of dip-molded article | | (N/mm) | 42.0 | 40.6 | 38.8 | 37.9 | 38.4 |
| Number of pinholes in dip-molded article | | (number of pinholes/ | 0 | 0 | 0 | 0 | 0 |

TABLE 1-continued piece

| | | | Example | Comparative Example | | |
|---|---|---|---|---|---|---|
| | | | 6 | 1 | 2 | 3 |
| Immersing step in coagulant solution | | | | | | |
| Immersion temperature | | (° C.) | 40 | 40 | 60 | 60 |
| Immersion time | | (seconds) | 3 | 10 | 3 | 3 |
| Concentration of coagulant | | (wt %) | 3 | 3 | 12 | 0.1 |
| Immersing step in latex composition | | | | | | |
| Latex composition | Conjugated diene polymer | | Carboxy-modified synthetic polyisoprene | Synthetic polyisoprene | Synthetic polyisoprene | Carboxy-modified synthetic polyisoprene |
| | Volume average particle size of conjugated diene polymer particles | (μm) | 0.91 | 1.12 | 1.12 | 0.91 |
| | Solids content | (wt %) | 10 | 10 | 30 | 30 |
| | Content of sulfur-based vulvanizing agent | (part) | 0.5 | 1.5 | 1.5 | 1.5 |
| Immersion time | | (seconds) | 6 | 6 | 6 | 6 |
| Evaluations of dip-molded article | | | | | | |
| Thickness of dip-molded article | | (mm) | 0.03 | 0.09 | 0.21 | 0.01 |
| Tensile stress at 500% elongation of dip-molded article | | (MPa) | 2.2 | 1.9 | 2.0 | 1.9 |
| Tensile strength of dip-molded article | | (MPa) | 30.4 | 21.1 | 20.8 | 17.0 |
| Tensile elongation of dip-molded article | | (%) | 944 | 1010 | 989 | 905 |
| Tear strength of dip-molded article | | (N/mm) | 51.3 | 25.1 | 24.6 | 25.5 |
| Number of pinholes in dip-molded article | | (number of pinholes/ piece | 0 | 23 | 14 | 0 |

Example 7

Production of Carboxy-Modified SIS (A-2) Latex

A carboxy-modified SIS (A-2) latex was prepared in the same manner as in Example 1 except that the styrene-isoprene-styrene block copolymer (SIS) (trade name "Quintac 3620", available from Zeon Corporation) was used instead of the synthetic polyisoprene (trade name "NIPOL IR2200L)", available from Zeon Corporation). The volume average particle size of the carboxy-modified SIS (A-2) particles contained in the carboxy-modified SIS (A-2) latex prepared was 0.64 μm.

A dip-molded article was produced in the same manner as in Example 5 except that the carboxy-modified SIS (A-2) latex was used instead of the carboxy-modified synthetic polyisoprene (A-1) latex, and was likewise evaluated. The results are shown in Table 2. The thickness of the dip-molded article obtained was 0.17 mm.

TABLE 2

| | | | Example 7 |
|---|---|---|---|
| Immersing step in coagulant solution | | | |
| Immersion temperature | | (° C.) | 60 |
| Immersion time | | (seconds) | 3 |
| Concentration of coagulant | | (wt %) | 12 |
| Immersing step in latex composition | | | |
| | Conjugated diene polymer | | Carboxy-modified SIS |
| Latex composition | Volume average particle size of conjugated diene polymer particles | (μm) | 0.64 |
| | Solids content | (wt %) | 30 |
| | Content of sulfur-based vulcanizing agent | (part) | 1.5 |
| Immersion time | | (seconds) | 6 |
| Evaluations of dip-molded article | | | |
| Thickness of dip-molded article | | (mm) | 0.17 |
| Tensile stress at 500% elongation of dip-molded article | | (MPa) | 1.8 |
| Tensile strength of dip-molded article | | (MPa) | 20.5 |
| Tensile elongation of dip-molded article | | (%) | 1034 |

TABLE 2-continued

| | | Example 7 |
|---|---|---|
| Tear strength of dip-molded article | (N/mm) | 22.2 |
| Number of pinholes in dip-molded article | (number of pinholes/piece) | 0 |

The dip-molded articles having a thickness of 0.02 to 0.19 mm and obtained by a producing method in which the mold for dip molding after immersed in a coagulant solution was immersed in the latex composition containing a carboxy-modified conjugated diene polymer latex which was a dispersion of carboxy-modified conjugated diene polymer particles having a volume average particle size of 500 to 2,000 nm in water had no pinholes, had good tensile stress, and excellent tensile strength, tensile elongation, and tear strength (Examples 1 to 7).

On the other hand, when the latex compositions containing a conjugated diene polymer latex containing a non-carboxy-modified conjugated diene polymer were used, it was observed that the resulting dip-molded articles had many pinholes (Comparative Examples 1 and 2).

Further, when the thickness of the dip-molded article produced was less than 0.02, the dip-molded article produced had inferior tensile strength and tear strength (Comparative Example 3).

The invention claimed is:

1. A method for producing a dip-molded article, comprising steps of:

immersing a mold for dip molding in a coagulant solution to deposit a coagulant on the mold for dip molding;

providing a latex composition containing a carboxy-modified conjugated diene polymer latex which is a dispersion of carboxy-modified conjugated diene polymer particles having a volume average particle size of 500 to 2,000 nm in water; and immersing the mold for dip molding having the coagulant deposited thereon in the latex composition to obtain a dip-molded article having a thickness of greater than or equal to 0.02 mm and less than 0.08 mm, wherein:

a concentration of the coagulant in the coagulant solution is 1 to 4 wt %, a solids content of the latex composition is 10 to 20 wt %, the latex composition comprises a sulfur-based vulcanizing agent, an amount of the sulfur-based vulcanizing agent is 0.2 to 0.6 parts by weight, with respect to 100 parts by weight of the carboxy-modified conjugated diene polymer, a glass mold having a non-roughened surface is used as the mold for dip molding, and a surface roughness Ra of the glass mold is 0.01 to 100 μm.

2. The method for producing the dip-molded article according to claim 1, wherein an immersion time in the immersing of the mold for dip molding in the coagulant solution is controlled to 0.1 to 20 seconds.

3. The method for producing the dip-molded article according to claim 1, wherein a temperature of the mold for dip molding is controlled to 20 to 100° C. when immersing the mold for dip molding in the coagulant solution.

4. The method for producing the dip-molded article according to claim 1, wherein an immersion time in the immersing of the mold for dip molding having the coagulant deposited thereon in the latex composition is controlled to 1 to 20 seconds.

5. The method for producing the dip-molded article according to claim 1, wherein the carboxy-modified conjugated diene polymer latex is a latex of a synthetic polyisoprene, a styrene-isoprene-styrene block copolymer, or a protein-free natural rubber.

6. The method for producing the dip-molded article according to claim 1, wherein the latex composition further comprises a vulcanization accelerator.

7. The method for producing the dip-molded article according to claim 6, wherein the vulcanization accelerator is a xanthogen compound.

8. The method for producing the dip-molded article according to claim 1, wherein the concentration of the coagulant in the coagulant solution is 3 to 4 wt %.

9. The method for producing the dip-molded article according to claim 8, wherein:

an immersion time for immersing the mold for dip molding in the coagulant solution is 1 to 4 seconds, an immersion temperature of the mold for dip molding is 40 to 65° C., and an immersion time for immersing the mold for dip molding having the coagulant deposited thereon in the latex composition is 3 to 6 seconds.

* * * * *